(12) United States Patent
Oguchi

(10) Patent No.: US 7,898,701 B2
(45) Date of Patent: Mar. 1, 2011

(54) IMAGE READING APPARATUS AND MULTI-FUNCTION MACHINE

(75) Inventor: Satoshi Oguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1000 days.

(21) Appl. No.: 11/732,652

(22) Filed: Apr. 4, 2007

(65) Prior Publication Data

US 2007/0247689 A1    Oct. 25, 2007

(30) Foreign Application Priority Data

Apr. 4, 2006    (JP) ............................ P2006-102957
Apr. 4, 2006    (JP) ............................ P2006-102958
Apr. 4, 2006    (JP) ............................ P2006-102959

(51) Int. Cl.
    *H04N 1/04*    (2006.01)
(52) U.S. Cl. ...................................... 358/474; 358/498
(58) Field of Classification Search ................. 358/486, 358/474, 471, 496, 498, 505, 500, 501, 509, 358/513, 514; 382/312, 318, 319; 250/208.1, 250/234, 235, 236; 399/378, 379, 380, 377, 399/367, 364, 220
See application file for complete search history.

(56) References Cited

U.S. PATENT DOCUMENTS

| | | | |
|---|---|---|---|
| 6,034,719 A * | 3/2000 | Tazawa et al. ................. | 348/96 |
| 6,489,602 B1 | 12/2002 | Wang et al. | |
| 7,034,967 B2 * | 4/2006 | Ochi et al. ................. | 358/487 |
| 7,119,934 B2 | 10/2006 | Yoshida et al. | |
| 7,235,769 B2 | 6/2007 | Uemura | |
| 7,389,925 B2 * | 6/2008 | Wei ............................ | 235/454 |
| 2002/0121590 A1 | 9/2002 | Yoshida et al. | |
| 2004/0080614 A1 | 4/2004 | Uemura | |
| 2005/0146758 A1 * | 7/2005 | Tsuchihashi ................ | 358/506 |
| 2005/0200917 A1 * | 9/2005 | Kanesaka et al. ........... | 358/486 |

FOREIGN PATENT DOCUMENTS

| JP | 1-126772 | 8/1989 |
|---|---|---|
| JP | 4-29267 | 3/1992 |
| JP | 4-261261 | 9/1992 |
| JP | 6-178059 | 6/1994 |
| JP | 8-163323 | 6/1996 |
| JP | 10-304105 | 11/1998 |
| JP | 10-308851 | 11/1998 |
| JP | 2003-158612 | 5/2003 |

* cited by examiner

*Primary Examiner*—Jerome Grant, II
(74) *Attorney, Agent, or Firm*—Nutter McClennen & Fish LLP; John J. Penny, Jr.

(57) ABSTRACT

An image reading apparatus has a light source and an image capturing device disposed to face each other with a document table interposed therebetween. The image reading apparatus includes: an image capturing device moving mechanism, operable to perform a moving operation for moving the image capturing device in a scanning direction; and a light source moving mechanism, operable to move the light source in the first direction with the movement operation performed by the image capturing device moving mechanism.

17 Claims, 10 Drawing Sheets

IMAGE READING APPARATUS AND MULTI-FUNCTION MACHINE

BACKGROUND

1. Technical Field

The present invention relates to an image reading apparatus and a multi-function machine.

2. Related Art

There is a related image reading apparatus for reading images of reflective and transmissive documents by the use of the same reading mechanism, in which a reflective reading mechanism for optically reading a document image by detecting intensity of light, which is emitted to a document table for holding a document from the same side as an image capturing device and reflected by the document, is provided and a reflecting plate for reflecting the light emitted from a light source is disposed on the opposite side of the light source about the document (for example, see JP-A-6-178059).

There is a related image reading apparatus which has a light source and an image capturing device disposed to face each other with a document table interposed therebetween and reads a document by causing the image capturing device to receive light emitted from the light source. An emission region having such an enough area to irradiate the entire document is secured in the light source of the image reading apparatus. A fluorescent tube or an LED is used as the light source.

However, in the art disclosed in JP-A-6-178059, the light focused on the image capturing device at the time of reading a transmissive document has passed through the transmissive document twice. Accordingly, since image data having a difference corresponding to the thickness of the document and having document images overlapped with each other are created, precision of the image data obtained by reproducing the document is lower than that of the original document.

On the contrary, as described above, in the image reading apparatus including a light source and an image capturing device disposed to face each other with a document table interposed therebetween, the reading of a document can be performed with high precision, but the following problems are caused depending on the types of light sources used therein.

When a fluorescent tube is used as the light source, there is a problem in that much time is required from a time when lighting the light source to a time when the light intensity is stabilized to such an enough level to perform a reading operation. When an emission region having such an enough area to irradiate the entire document is to be secured by the use of the light source employing the fluorescent tube, the light source increases in size and the image reading apparatus also increases accordingly in size with the increase in size of the light source.

When an LED is used as the light source, it is possible to carry out the operation of reading a document just after lighting the light source and it is also possible to reduce an occurrence of a noise in the image data. However, since an irradiating area of one LED is limited, a plurality of LEDs should be provided to secure an emission region having such an enough area to irradiate the entire document. Accordingly, the light source increases in size and the image reading apparatus also increases accordingly in size with the increase in size of the light source.

When a single light source includes a plurality of LEDs, there is a problem that quality of image data deteriorates due to irregular light intensity by the LEDs and the cost for manufacturing an image reading apparatus increases.

SUMMARY

An advantage of some aspects of the invention is to provide an image reading apparatus which can perform an operation of reading a document with high precision and can accomplish a decrease in size and a decrease in power consumption.

According to an aspect of the invention, there is provided an image reading apparatus which has a light source and an image capturing device disposed to face each other with a document table interposed therebetween and holding a document, the image reading apparatus comprising: an image capturing device moving mechanism, operable to perform a moving operation for moving the image capturing device in a scanning direction; and a light source moving mechanism, operable to move the light source in the first direction with the movement operation performed by the image capturing device moving mechanism.

With this configuration, it is possible to move the light source in the scanning direction by the light source moving mechanism in association with the movement of the image capturing device in the scanning direction by the image capturing device moving mechanism. Therefore, the image reading apparatus can perform an operation of reading a document with high precision and can accomplish a decrease in size of the light source and a decrease in power consumption due to the decrease in size of the light source. Accordingly, a user can obtain image data with high precision by the use of a small-sized image reading apparatus with decreased power consumption.

The light source moving mechanism may move the light source by using a driving force of a driving source, which is used by the image capturing device moving mechanism.

In this case, the image capturing device and the light source can be moved by the use of the driving force of the same driving source. Therefore, the image reading apparatus can perform an operation of reading a document with high precision and can accomplish a decrease in size of the image reading apparatus due to the sharing of the driving source and a decrease in power consumption due to the sharing of the driving source. Accordingly, a user can obtain image data with high precision by the use of a small-sized image reading apparatus with decreased power consumption.

The image reading apparatus may further include an interlocking mechanism, operable to interlock the image capturing device moving mechanism with the light source moving mechanism.

In this case, by connecting the driving source and the light source moving mechanism to each other by the use of the image capturing device moving mechanism in a part, it is possible to move the image capturing device and the light source by the use of the driving force of the same driving source. Therefore, the image reading apparatus can perform an operation of reading a document with high precision and can accomplish a decrease in size of the image reading apparatus due to the sharing of the driving source. Accordingly, a user can obtain image data with high precision by the use of a small-sized image reading apparatus with decreased power consumption.

According to another aspect of the invention, there is provided an image reading apparatus which has a light source disposed in a cover member which is attached to and detached from a document table for holding a document and an image capturing device disposed opposite to the light source with the document table interposed therebetween, the image reading apparatus comprising: an image capturing device moving mechanism, operable to move the image capturing device in a scanning direction; a driving source, operable to supply a driving force to the image capturing device moving mechanism; a light source moving mechanism, disposed in the cover member and operable to move the light source in the scanning direction; and an interlocking mechanism, operable to interlock the image capturing device moving mechanism with the light source moving mechanism depending on attachment or detachment of the cover member to or from the document table.

With this configuration, it is possible to interlock the light source moving mechanism with the image capturing device moving mechanism depending on the attachment or detachment of the cover member. Therefore, the image reading apparatus can accomplish a decrease in size of the image reading apparatus due to the sharing of the driving source and a decrease in power consumption due to the sharing of the driving source. Accordingly, a user can easily interlock the light source moving mechanism with the image capturing device moving mechanism by performing only an operation of attaching and detaching the cover member to and from the document table, thereby obtaining image data with high precision.

The interlocking mechanism may interlock the light source moving mechanism with the image capturing device moving mechanism when the cover member is in a state where light emitted from the light source can be received by the image capturing device.

In this case, it is possible to interlock the light source moving mechanism with the image capturing device moving mechanism, only when a transmissive document can be read. Therefore, since the image reading apparatus interlocks the light source moving mechanism with the image capturing device moving mechanism only at the time of reading the transmissive document, it is possible to suppress a load on the driving source to the minimum due to the driving of the light source moving mechanism and the image capturing device moving mechanism with a single driving source. Accordingly, a user can obtain image data with high precision by the use of the image reading apparatus with power consumption suppressed to the minimum.

The image reading apparatus may further include a hinge portion, rotatably connecting one end of the cover member to a main body housing for housing the image capturing device. The cover member may rotate about the main body housing with the hinge portion so as to be attached to and detached from the document table.

In this case, the cover member can be attached to and detached from the document table by allowing the cover member to rotate about the hinge portion connecting one end portion of the cover member to the main body housing. Therefore, the image reading apparatus can interlock the light source moving mechanism with the image capturing device moving mechanism without requiring a user's particular work or operation. Accordingly, the user can obtain image data with high precision by easily interlocking the light source moving mechanism with the image capturing device moving mechanism.

The driving source may be disposed in the main body housing.

In this case, it is possible to reduce the weight of the cover member. Therefore, the image reading apparatus can reduce a user's burden accompanied with the rotation of the cover member. Accordingly, the user can obtain image data with high precision by rotating the cover member with a small burden to interlock the light source moving mechanism with the image capturing device moving mechanism.

The driving source may be disposed in the cover member.

In this case, it is possible to reduce the number of members disposed in the main body housing. Therefore, it is possible to prevent a damage of the image reading apparatus due to the heat radiation resulting from the excessive density in the main body housing. Accordingly, a user can use safely a small-sized image reading apparatus with reduced power consumption and can obtain image data with high precision by only attaching and detaching the cover member to and from the document table.

The light source may include an LED.

In this case, it is possible to read a document just after lighting the light source. Therefore, the image reading apparatus can rapidly start the reading of a document and accomplish an enhancement in reading precision. Accordingly, a user can obtain image data with high precision for the minimum time. In addition, it is possible to suppress the power consumption by using the LEDs, thereby suppressing running cost, compared with a case where a fluorescent tube is used instead of the LEDs.

According to another aspect of the invention, there is provided a multi-function machine comprising; the image reading apparatus according; and an image forming apparatus operable to form on a recording medium an image corresponding to intensity of light received by the image capturing device of the image reading apparatus.

With this configuration, it is possible to move the light source in the scanning direction by the light source moving mechanism with the movement of the image capturing device in the scanning direction by the image capturing device moving mechanism of the image reading apparatus. Therefore, the multi-function machine can form an image, which is reproduced from the document with high precision, on the recording medium while suppressing an increase in power consumption and an increase in size of the multi-function machine. Accordingly, a user can obtain image data with high precision by the use of the multi-function machine with reduced power consumption.

According to another aspect of the invention, there is provided an image reading apparatus which has a light source disposed in a cover member which is attached to and detached from a document table for holding a document and an image capturing device disposed opposite to the light source with the document table interposed therebetween, the image reading apparatus comprising: a light source moving mechanism, disposed in the cover member and operable to move the light source in a scanning direction; an image capturing device moving mechanism, operable to move the image capturing device in the scanning direction; a driving source, operable to supply a driving force to the image capturing device moving mechanism; and an interlocking mechanism, including a pair of gears engaging with each other depending on a position of the cover member relative to the document table, and operable to interlock the image capturing device moving mechanism with the light source moving mechanism through the pair of gears.

With this configuration, it is possible to interlock the light source moving mechanism with the image capturing device moving mechanism by connecting the light source moving mechanism to the image capturing device moving mechanism through the pair of gears, depending on the attachment or detachment of the cover member. Therefore, the image reading apparatus can accomplish a decrease in size of the image reading apparatus due to the sharing of the driving source and a decrease in power consumption due to the sharing of the driving source. Accordingly, a user can easily interlock the light source moving mechanism with the image capturing device moving mechanism and thus interlock the light source with the image capturing device by performing only an operation of attaching and detaching the cover member to and from the document table, thereby obtaining image data with high precision.

Furthermore, it is possible to connect the light source moving mechanism to the image capturing device moving mechanism through the pair of gears, which is widely used in the technical field of supplying a driving force and does not slide at the time of supplying the driving force. Therefore, it is possible to accomplish easiness in design and adjustment of a mechanism for connecting the light source moving mechanism to the image capturing device moving mechanism, thereby enhancing reliability of operations. Accordingly, a user can obtain image data with high precision by easily and reliably interlocking the light source moving mechanism with the image capturing device moving mechanism.

The pair of gears may engage with each other when the cover member is in a state where light emitted from the light source can be received by the image capturing device.

In this case, it is possible to connect the light source moving mechanism with the image capturing device moving mechanism, only when a transmissive document can be read. Therefore, since the image reading apparatus interlocks the light source moving mechanism with the image capturing device moving mechanism only at the time of reading the transmissive document, it is possible to suppress a load on the driving source to the minimum due to the driving of the light source moving mechanism and the image capturing device moving mechanism with a single driving source. Accordingly, a user can obtain image data with high precision by the use of the image reading apparatus with power consumption suppressed to the minimum.

The pair of gears may engage with each other by fitting uneven portions formed between a pair of rotating members capable to rotate about an axial shaft substantially parallel to an opposing direction in which the light source and the image capturing device are disposed opposite to each other.

In this case, it is possible to easily and reliably connect the pair of gears to each other by fitting the uneven portions. Therefore, according to the image reading apparatus, it is possible to enhance the reliability of operations by reliably interlocking the light source moving mechanism with the image capturing device moving mechanism. Accordingly, a user can obtain image with high precision by easily and reliably interlocking the light source moving mechanism with the image capturing device moving mechanism.

The rotating members may be disposed opposite to each other in the opposing direction.

In this case, it is possible to fit the uneven portions with the operation of the cover member for allowing the light source to face the image capturing device. Therefore, it is possible to reduce a user's burden to fit the uneven portions by easily fitting the uneven portions. Accordingly, the user can obtain image data with high precision by easily interlocking the light source moving mechanism with the image capturing device moving mechanism.

The image reading apparatus may further include a hinge portion, rotatably connecting one end of the cover member to a main body housing for housing the image capturing device. The cover member may rotate about the main body housing with the hinge portion so as to be attached to and detached from the document table.

In this case, it is possible to freely connect the light source moving mechanism to the image capturing device moving mechanism by allowing the cover member to rotate about the hinge portion. Therefore, since the cover member can be allowed to rotate about the hinge portion by the use of a leverage principle, it is possible to reduce a user's burden at the time of attaching and detaching the cover member to and from the document table. Accordingly, the user can obtain image data with high precision by easily attaching and detaching the cover member to and from the document table.

The present disclosure relates to the subject matter contained in Japanese patent application Nos. 2006-102957 filed on Apr. 4, 2006, 2006-102958 filed on Apr. 4, 2006 and 2006-102959 filed on Apr. 4, 2006, which are expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an image reading apparatus according to a first embodiment of the invention will be described in detail with reference to the accompanying drawings. The first embodiment relates to a scanner in which the image reading apparatus according to the invention is embodied.

Figure 1:
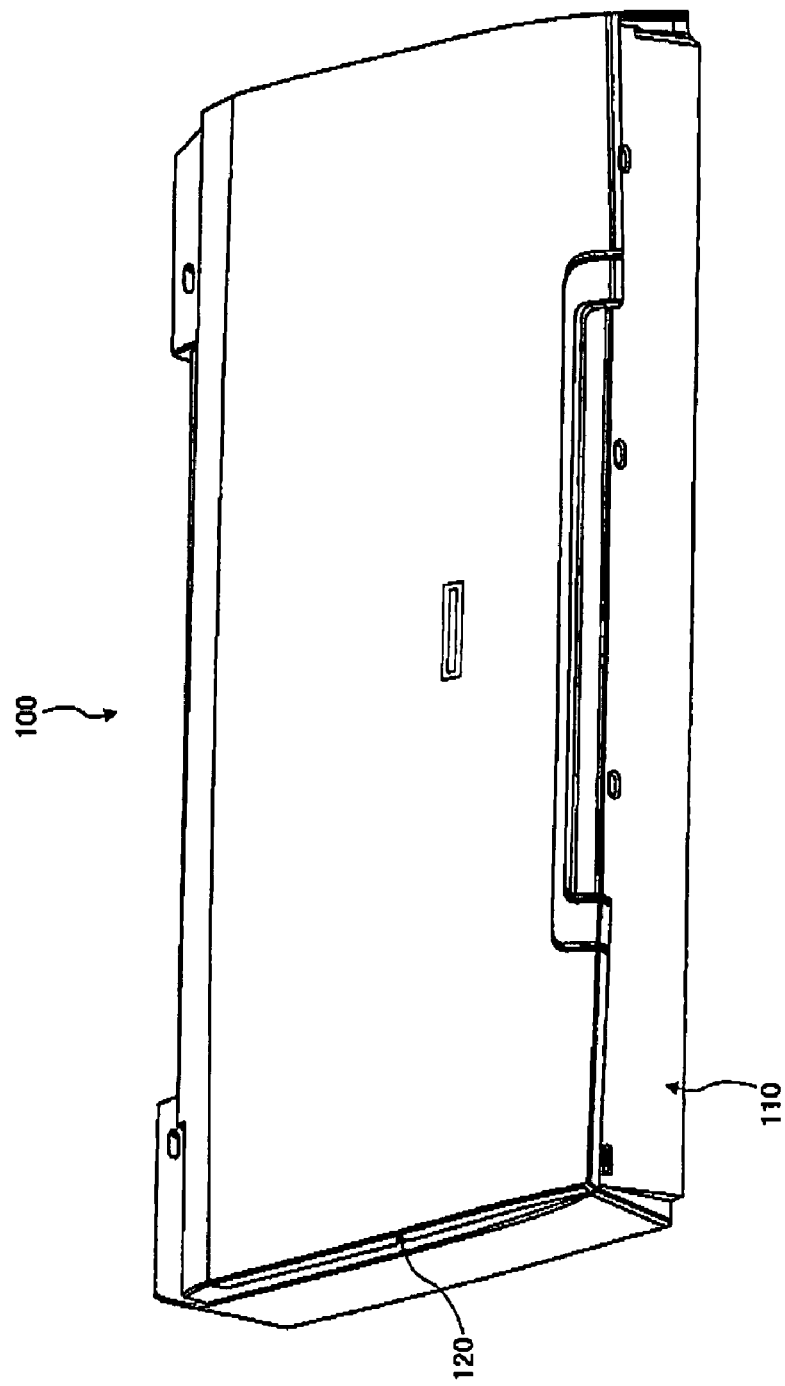
FIG. 1 is a perspective view illustrating an appearance of a scanner according to a first embodiment of the invention.

FIG. 1 is a perspective view illustrating an appearance of a scanner according to the first embodiment of the invention. The appearance of the scanner according to the first embodiment will be first described with reference to FIG. 1. As shown in FIG. 1, the scanner 100 includes a main body unit 110 and a transmissive-document light source unit (hereinafter, referred to as "TPU unit") 120.

Figure 3:
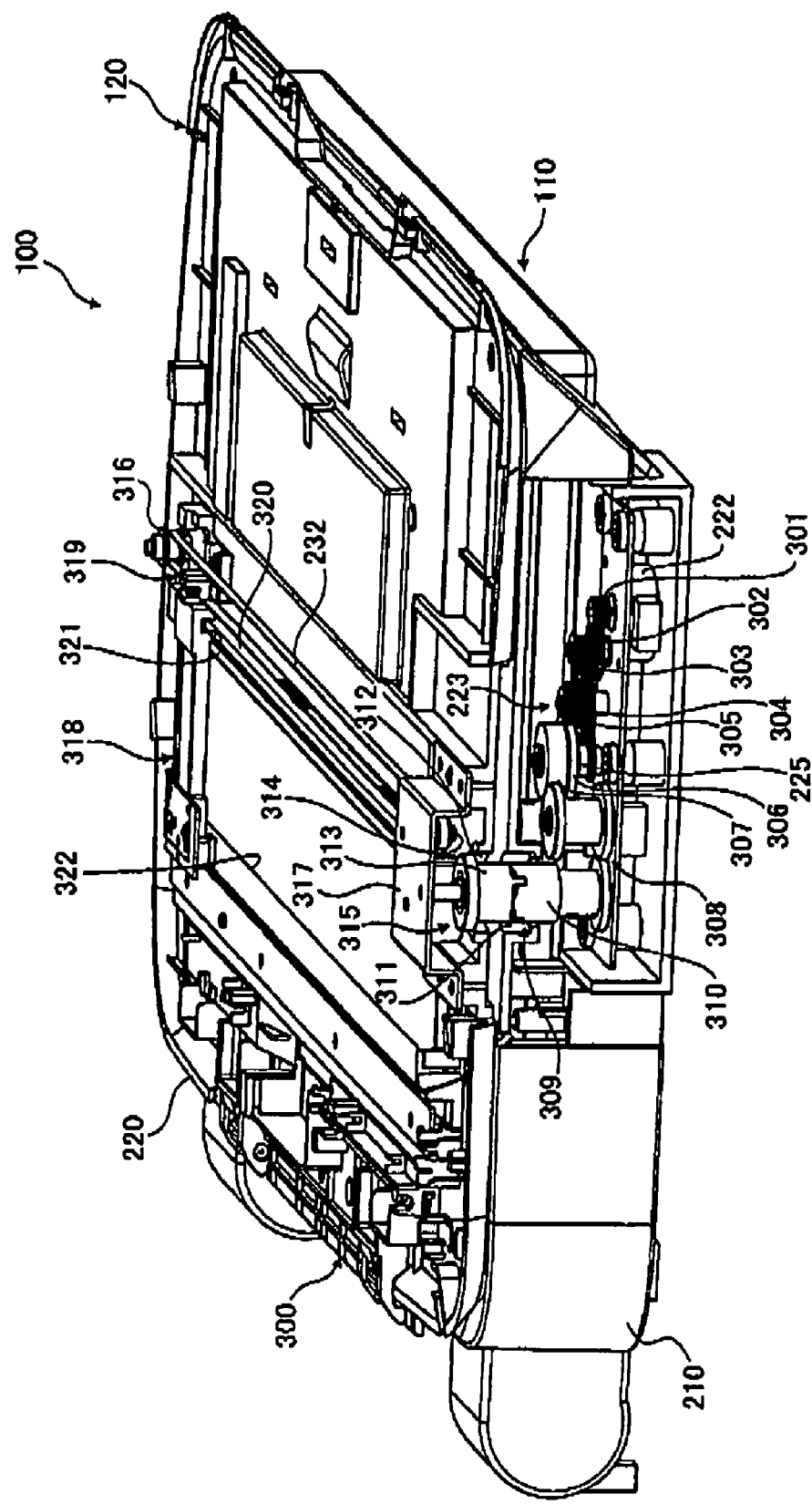
FIG. 3 is a partially sectional perspective view of the scanner.

The TPU unit 120 is disposed opposite to the main body unit 110 and is connected to the main body unit 110 through a hinge portion (see FIG. 3). The TPU unit 120 can rotate about the hinge portion in a direction getting away from the main body unit 110 from the state shown in FIG. 1.

Figure 2:
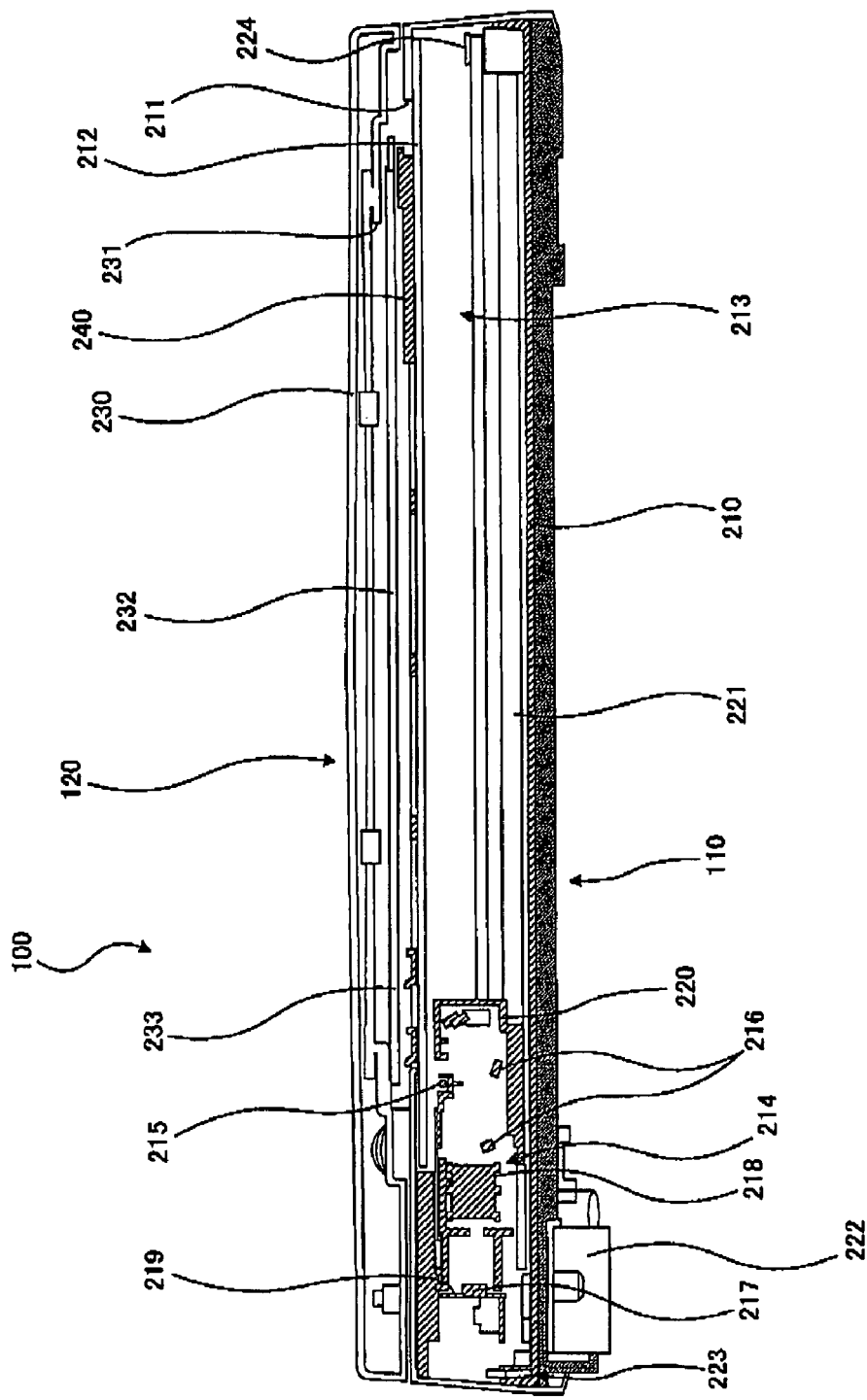
FIG. 2 is a longitudinal-section front view illustrating the scanner according to the first embodiment.

FIG. 2 is a longitudinal-section front view of the scanner 100 according to the first embodiment. A rough configuration of the scanner 100 according to the first embodiment will be next described with reference to FIG. 2. As shown in FIG. 2, the scanner 100 includes a main body housing 210 constituting the outline of the main body unit 110 and a TPU housing 230 constituting the outline of the TPU unit 120.

Each of the main body housing 210 and the TPU housing 230 includes two parts which can be separated vertically. Particular reference numerals are omitted, but the parts constituting the upper portions of the main body housing 210 and the TPU housing 230 are referred to as an upper main body housing and an upper TPU housing, respectively. Similarly, the parts constituting the lower portions of the main body housing 210 and the TPU housing 230 are referred to as a lower main body housing and a lower TPU housing, respectively.

A rough configuration of the main body unit 110 is first described. The main body housing 210 of the main body unit 110 includes an opening 211 opened to the TPU housing 230. The opening 211 is provided with a document table glass 212 so as to cover the opening 211.

In the first embodiment, a reading window is constituted by the opening 211 and the document table glass 212, and a frame member is constituted by a peripheral portion of the opening 211 of the main body housing 210. A document to be read is placed on the document table glass 212.

An optical member 214 for optically reading an image of the document placed on the document table glass 212 is provided in a space 213 formed by the main body housing 210 and the document table glass 212. The optical member 214 includes a reflective light source 215 for emitting light to the document table glass 212, a plurality of mirrors 216 for guiding the light, which is emitted from the reflective light source 215 and reflected by the document, to a predetermined path, an image capturing device 217 for receiving the light guided by the mirrors 216, and a lens 218 for focusing the light guided by the mirrors 216 on the image capturing device 217.

Photodiodes which convert an optical image focused on a light-receiving face into electrical signals corresponding to the light intensity received by each element and output the electrical signals can be used as the image capturing device 217. In the scanner 100, a linear image sensor in which the photodiodes are linearly arranged in a main scanning direction on a scanning circuit board 219 is used as the image capturing device 217.

A scanner carriage 220 is also provided in the space 213. The scanner carriage 220 is slidable along a carriage guide 221 which is parallel to the document table glass 212 and which extends in a sub scanning direction as a scanning direction.

A driving force generated from a motor 222 as a power source is supplied to the scanner carriage 220 through an image capturing device moving mechanism 223 connected to the motor 222. As described later, the image capturing device moving mechanism 223 includes a gear train connected to a drive shaft of the motor 222 and a drive belt 225 disposed between gears of the gear train and a follower gear 224 (see FIG. 3). The scanner carriage 220 is connected to the drive belt 225.

The scanner carriage 220 moves in the sub scanning direction along the document table glass 212 by supplying the driving force generated from the motor 222 to the scanner carriage through the image capturing device moving mechanism 223. The optical member 214 is mounted on the scanner carriage 220. The optical member 214 moves in the sub scanning direction along the document table glass 212 with the movement of the scanner carriage 220.

Next, a schematic configuration of the TPU unit 120 will be described. The TPU housing 230 of the TPU unit 120 is provided with an opening 231 opened to the main body housing 210 so as to face the main body housing 210. A protective mat 232 is disposed to cover the opening 231 of the TPU housing 230. The protective mat is detachable from the TPU housing 230.

The TPU housing 230 is provided with a transmissive light source unit (see FIG. 3) as a light source. The transmissive light source unit is used to read a light-transmitting document such as a photograph film and emits light toward the document table glass 212. The transmissive light source unit is movable in the sub scanning direction along the document table glass 212.

The TPU housing 230 is provided with a power supply mechanism (see FIG. 3) for supplying the driving force of the motor 222 to the transmissive light source unit. Although not shown and described in detail, the power supply mechanism disposed in the TPU unit 120 includes a pulley group connected to the image capturing device moving mechanism 223, a drive belt 233 and a pair of gears on which the drive belt 233 is suspended.

In the first embodiment, the power supply mechanism disposed in the TPU housing 230 is connected to the motor 222 to supply the driving force of the motor 222 to the transmissive light source when the protective mat 232 is detached from the TPU housing 230. In this case, only when the protective mat 232 is detached from the TPU housing 230, the transmissive light source unit moves in the sub scanning direction along with the scanner carriage 220 by means of the driving force supplied from the motor 222.

At the time of reading a light-transmitting document (hereinafter, referred to as "film") such as a film, a film holder 240 is disposed on the document table glass 212, that is, between the main body unit 110 and the TPU unit 120. The film holder 240 is a member for guiding the film so as to be located at a reading position for a film on the document table glass 212 and fixing the film on the reading position.

FIG. 3 is a partially sectional perspective view of the scanner 100. FIG. 3 shows a state where the upper TPU housing of the TPU housing 230 is removed and a part of the main body housing 210 is cut out. In FIG. 3, reference numeral 300 denotes a hinge portion for connecting the main body unit 110 and the TPU unit 120 to each other. Now, respective units supplied with the driving force of the motor 222 are described with reference to FIG. 3.

As shown in FIG. 3, an image capturing device moving mechanism 223 disposed in the main body housing 210 includes a gear 301 fixed to a drive shaft of a motor 222 and a gear train 302 to 306 connected to the gear 301. A gear on which the drive belt 225 is suspended is disposed on a shaft which is a rotation axis of the gear 306.

The image capturing device moving mechanism 223 causes the drive belt 225 to rotate by supplying the driving force generated from the motor 222 to the drive belt 225 through the gears 301 to 306. Accordingly, the scanner carriage 220 connected to the drive belt 225 can move in the sub scanning direction.

The shaft as a rotation axis of the gear 306 is provided with a pulley 307 using the shaft as a rotation axis. A gear 310 constituting an interlocking mechanism 309 is connected to the pulley 307 through a plurality of pulley groups 308 rotating with the rotation of the pulley 307. The gear 310 constitutes the interlocking mechanism 309 by engaging with a gear 313 disposed on the TPU unit 120 side through openings 311 and 312 which are opened toward the TPU unit 120 on the top surface of the main body housing 210.

The TPU housing 230 is provided with a pulley group 315 for connecting one gear 314 of the pair of gears, which the drive belt 233 is suspended on, to the gear 313. The other gear 316 of the pair of gears rotates with the rotation of the drive belt 233. The gear 314 and the gear 316 are disposed opposite to each other along the sub scanning direction. Here, the light source moving mechanism is constituted by the drive belt 233, the gears 314 and 316 of the pair of gears, and the pulley group 315.

In FIG. 3, reference numeral 317 denotes a stay for supporting shafts of the gear 313, the pulleys of the pulley group 315, the gear 314, and the like. The gear 313 is disposed to be detachable from the stay 317. As a result, the gear 310 and the gear 313 can be allowed to detachably engage with each other.

In FIG. 3, reference numeral 318 denotes the transmissive light source unit. The transmissive light source unit 318 is connected to the drive belt 232 at a fixed portion 319 disposed in the transmissive light source unit 318. Accordingly, the transmissive light source unit 318 moves in the sub scanning direction with the rotation of the drive belt 232.

The TPU housing 230 is provided with a guide rail 320 extending in the sub scanning direction at a position which is a side of the drive belt 232 and which is overlapped with the movement trace of the transmissive light source unit 318. The guide rail 320 is inserted into a groove 321 disposed at a position opposed to the guide rail 320 in the transmissive light source unit 318. Accordingly, the transmissive light source unit 318 can stably move in the sub scanning direction.

The light emitted from the transmissive light source unit 318 is guided to the document table glass 212 through an opening 322 formed in the TPU housing 230. The opening 322 is disposed to cover a film reading range in the transmissive light source unit 318.

Figure 4:
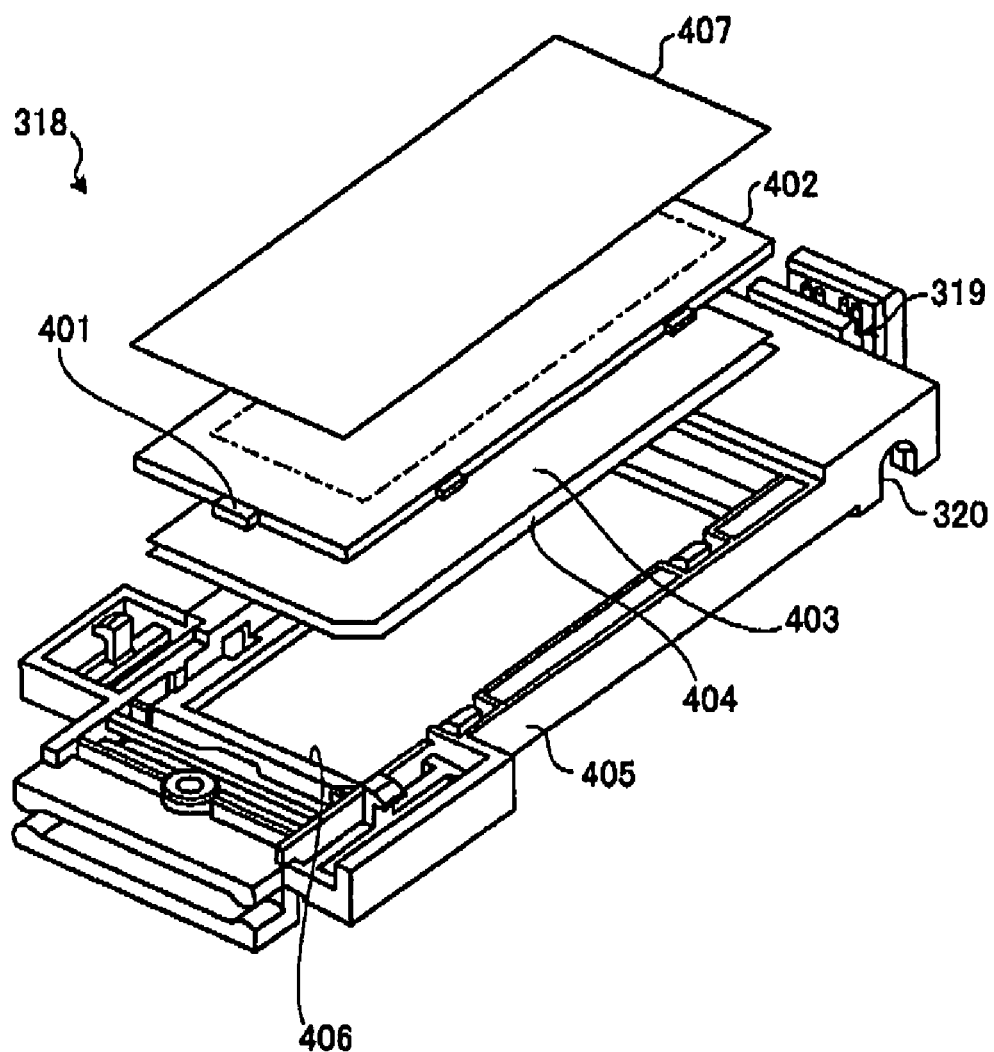
FIG. 4 is an exploded perspective view illustrating a transmissive light source unit.

FIG. 4 is an exploded perspective view illustrating the transmissive light source unit 318. Next, a configuration of the transmissive light source unit 318 will be described with reference to FIG. 4. As shown in FIG. 4, the transmissive light source unit 318 includes LEDs 401 and a light guide plate 402 for guiding the light emitted from the LEDs 401. An area larger than an irradiating area of one LED can be irradiated by the light guide plate 402. In FIG. 4, a virtual line marked on the light guide plate 402 indicates an effective emission area of the light guide plate 402.

The light guided by the light guide plate 402 is made to travel from the opening 406 disposed in the support frame 405 to the document table glass 212 through a prism sheet 403 and a diffusion sheet 403. By employing the prism sheet 403 and the diffusion sheet 404, the light guided by the light guide plate 402 can be more uniformly radiated in a larger area.

In the transmissive light source unit 318, a reflecting plate 407 for reflecting the light guided by the light guide plate 402 toward the opening 406 is disposed on the side opposite to the opening 406 with the light guide plate 402 interposed therebetween. By providing the reflecting plate 407, the light guided by the light guide plate 402 can be efficiently radiated toward the document table glass 212. The fixing portion 319 is disposed on a side of the support frame 405 and is opened upward so as to press the drive belt 233 from the document table glass 212 side.

Figure 5:
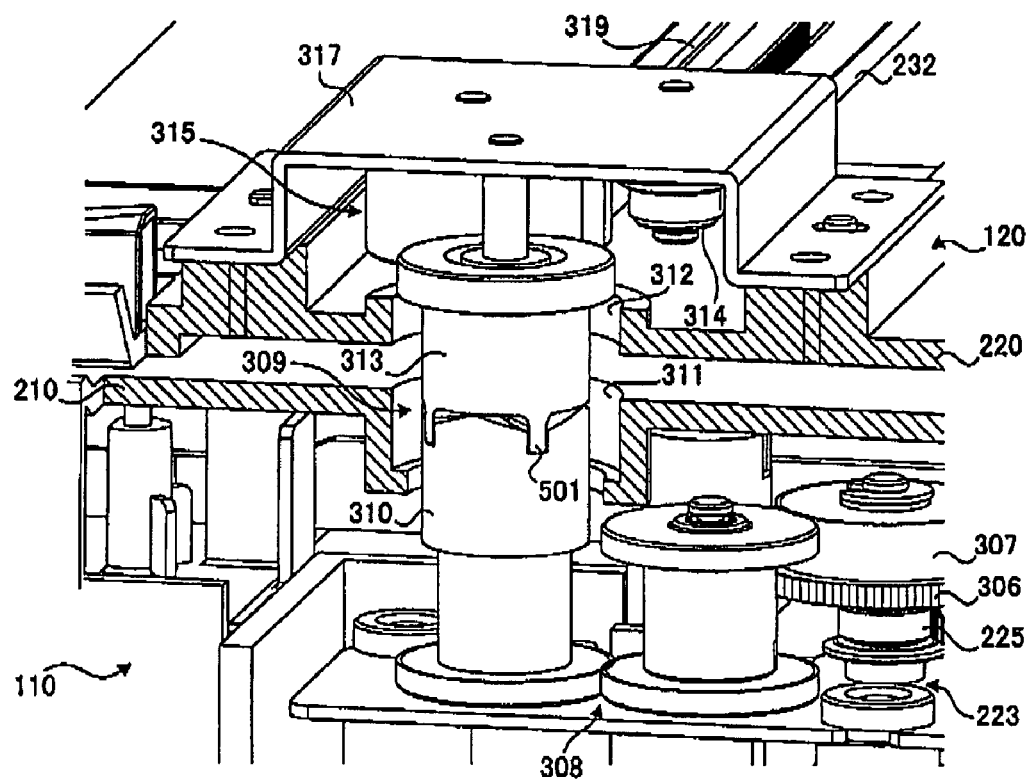
FIG. 5 is an enlarged perspective view of an interlocking mechanism (first).
Figure 6:
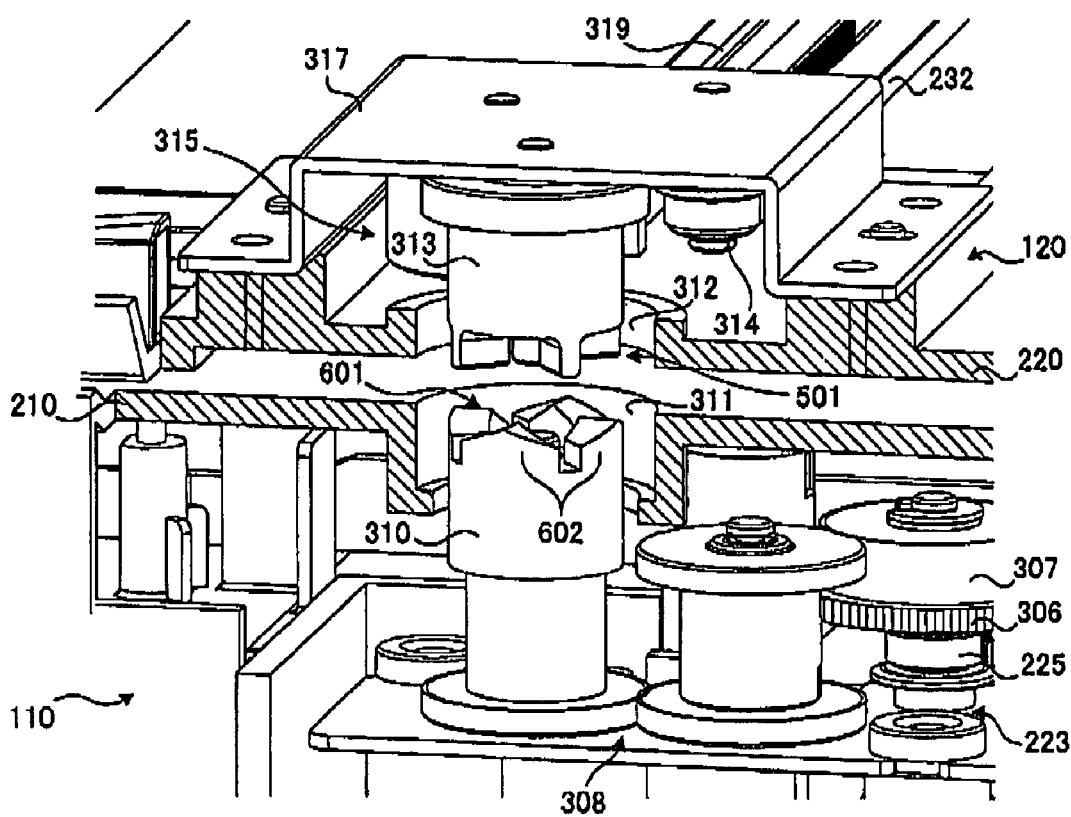
FIG. 6 is an enlarged perspective view of the interlocking mechanism (second).

FIG. 5 is an enlarged perspective view (first) of an interlocking mechanism 309 and FIG. 6 is an enlarged perspective (second) of the interlocking mechanism 309. FIG. 5 shows a state where the gear 310 and the gear 313 engage with each other. FIG. 6 shows a state where the gear 310 and the gear 313 disengage from each other.

As can be seen from FIGS. 5 and 6, the gear 313 of the interlocking mechanism 309 is provided with gear teeth 501 protruding toward the TPU unit 110. Concave portions 601 engaging with the gear teeth 501 are formed in the gear 310 of the interlocking mechanism 309. The top portion of ribs 602 which are located between the concave portions 601 to form the concave portions 601 are formed in a mountain shape of which the centers protrude toward the gear 313. Accordingly, the gear teeth 501 can be guided to the concave portions 601 so as to allow the gear 310 and the gear 313 to engage with each other.

Although not shown in the figures, the scanner 100 further includes an operation panel for inputting a variety of user's instructions, a variety of control circuits for controlling the constituent elements of the scanner 100, and a control system for controlling the variety of control circuits in accordance with the instructions input from the operation panel, in addition to the above-mentioned configuration. An instruction for reading an image of a document (reflective document) such as a sheet of paper not transmitting light, an instruction for reading an image of a film, and the like are input to the operation panel.

Although not shown in the figures, the scanner 100 may further include a communication I/F for performing a communication with an external device such as a personal computer. In this case, the scanner 100 receives commands corresponding to instructions input to the personal computer through the communication I/F.

The scanner 100 moves the scanner carriage 220, lights/extinguishes the reflective light source 215 or the transmissive light source unit 318, or creates image data by converting the light focused on the image capturing device 217 into electrical signals, in accordance with instructions input to the operation panel or commands received through the communication I/F. In the first embodiment, a function of image data creating means is embodied by elements associated with the creating the image data and a variety of processes performed by the elements.

The scanner 100 may store the created image data in any storage medium or may transmit the created image data to an external device such as a personal computer through the communication I/F. In the first embodiment, a function of output means is embodied by elements associated with the transmission of the created image data to the external device and a variety of processes performed by the elements.

When an image of a film is read by the scanner 100 having the above-mentioned configuration, a user places a film holder 240 on the document table glass 212 and places a film at a predetermined position guided by the film holder 240. The user detaches the protective mat 232 from the TPU housing 230 before or after placing the film.

Subsequently, as shown in FIG. 1 or 2, the user causes the TPU unit 120 to face the main body unit 110. Accordingly, the gear 310 and the gear 313 in the interlocking mechanism 309 engage with each other, thereby connecting the image capturing device moving mechanism 223 and the light source moving mechanism to each other.

Thereafter, the user inputs an instruction for reading an image of the film. The instruction may be input through an operation panel of the scanner 100 or may be input through the external device such as a personal computer.

When the instruction for reading the image of the film is input, the scanner 100 drives the motor 222 and detects the intensity of light received by the image capturing device 217 while moving the scanner carriage 220 and the transmissive light source unit 318 in the sub scanning direction. The scanner creates image data based on the detected intensity of light.

Before creating the image data, the scanner may acquire a variety of reference data serving as a reference of a black color or a white color in the image data and may perform a shading correction on the image data on the basis of the acquired reference data. The acquisition of the reference data and the shading correction using the acquired reference data are not described herein.

As described above, according to the scanner 100 of the first embodiment, it is possible to move the transmissive light source unit 318 in the main scanning direction by the use of the light source moving mechanism with the movement of the image capturing device 217 in the main scanning direction by the use of the image capturing device moving mechanism 223. Therefore, the scanner 100 can perform an operation of reading a document with high precision and can accomplish a decrease in size of the transmissive light source unit 318 and a decrease in power consumption due to the decrease in size of the transmissive light source unit 318. Accordingly, a user can obtain image data with high precision by the use of a small-sized scanner 100 with decreased power consumption.

According to the scanner 100, the image capturing device 217 and the transmissive light source unit 318 can be moved by the use of the driving force of the same driving source. Therefore, the scanner 100 can perform an operation of reading a film with high precision and can accomplish a decrease in size of the scanner 100 due to the sharing of the motor 222 and a decrease in power consumption due to the sharing of the motor 222. Accordingly, a user can obtain image data with high precision by the use of a small-sized scanner 100 with decreased power consumption.

According to the scanner 100, by connecting the motor 222 and the light source moving mechanism to each other by the use of the image capturing device moving mechanism 223 in a part, it is possible to move the image capturing device 217 and the transmissive light source unit 318 by the use of the driving force of the same motor 222. Therefore, the scanner 100 can perform an operation of reading a film with high precision and can accomplish a decrease in size of the scanner 100 due to the sharing of a constituent element. Accordingly, a user can obtain image data with high precision by the use of a small-sized scanner 100 with decreased power consumption.

According to the scanner 100, it is possible to read a film just after lighting the light source. Therefore, the scanner 100 can rapidly start reading of a film and accomplish an enhancement in reading precision. Accordingly, a user can obtain image data with high precision for the minimum time.

According to the scanner 100, it is possible to suppress the power consumption by using the LEDs 401, compared with a case where a fluorescent tube is used. Accordingly, a user can rapidly obtain image data which are reproduced from an image of a document with high precision while suppressing running cost.

As described above, according to the scanner 100 of the first embodiment, it is possible to interlock the light source moving mechanism with the image capturing device moving mechanism 223, depending on the attachment or detachment of the TPU unit 120 to or from the main body unit 110.

Therefore, the scanner 100 can accomplish a decrease in size of the scanner 100 due to the sharing of the motor 222 and a decrease in power consumption due to the sharing of the motor 222. Accordingly, a user can easily interlock the light source moving mechanism with the image capturing device moving mechanism 223 by performing only an operation of attaching and detaching the TPU unit 120 to and from the document table glass 212, thereby obtaining image data with high precision.

According to the scanner 100 of the first embodiment, it is possible to interlock the light source moving mechanism with the image capturing device moving mechanism 223, only when the film can be read. Therefore, since the scanner 100 interlocks the light source moving mechanism with the image capturing device moving mechanism 223 only at the time of reading a film, it is possible to suppress a load on the motor 222 to the minimum due to the driving of the light source moving mechanism and the image capturing device moving mechanism 223 with a single motor 222. Accordingly, a user can obtain image data with high precision by the use of the image reading apparatus with power consumption suppressed to the minimum.

According to the scanner 100 of the first embodiment, it is possible to interlock the light source moving mechanism with the image capturing device moving mechanism 223 without requiring a user's particular work or operation, by allowing the TPU unit 120 to rotate about the hinge portion 300 with respect to the main body unit 110. Accordingly, a user can obtain image data with high precision by interlocking the light source moving mechanism with the image capturing device moving mechanism 223 with an easy operation.

According to the scanner 100 of the first embodiment, since the motor 222 is disposed in the main body housing 210, it is possible to reduce the weight of the TPU unit 120 and thus to reduce a user's burden accompanied with the rotation of the TPU unit 120. Accordingly, a user can obtain image data with high precision by rotating the TPU unit 120 with a small burden and interlocking the light source moving mechanism with the image capturing device moving mechanism 223.

According to the scanner 100 of the first embodiment, it is possible to connect the transmissive light source unit 318 to the image capturing device moving mechanism 223 by the use of the interlocking mechanism 309 including the gears 310 and 313, which are widely used in the technical field of supplying dynamic power and can be easily and reliably designed and adjusted.

Therefore, according to the scanner 100, it is possible to reliably connect the transmissive light source unit 318 to the image capturing device moving mechanism 223 without complicating the configuration, thereby enhancing the reliability of the scanner 100. Accordingly, a user can obtain image data which are reproduced from an image to be read with high precision by the use of the scanner 100 with high reliability, even the target to be read is a reflective document or a film.

According to the scanner 100 of the first embodiment, it is possible to connect the transmissive light source unit 318 to the image capturing device moving mechanism 223, only when the TPU unit 120 is disposed opposite to the document table glass 212. Accordingly, a user can easily perform an operation of reading a film without feeling unpleasant or stress, by only performing the same operation as the operation of the related art for disposing the TPU unit 120 to be opposite to the document table glass 212 so as to place a film on the document table glass 212.

Second Embodiment

Next, an image reading apparatus according to a second embodiment of the invention will be described in detail with reference to the accompanying drawings. The second embodiment relates to a scanner in which the image reading apparatus according to the invention is embodied. In the second embodiment, the same elements as the first embodiment are denoted by the same reference numerals and description thereof is omitted.

Figure 7:
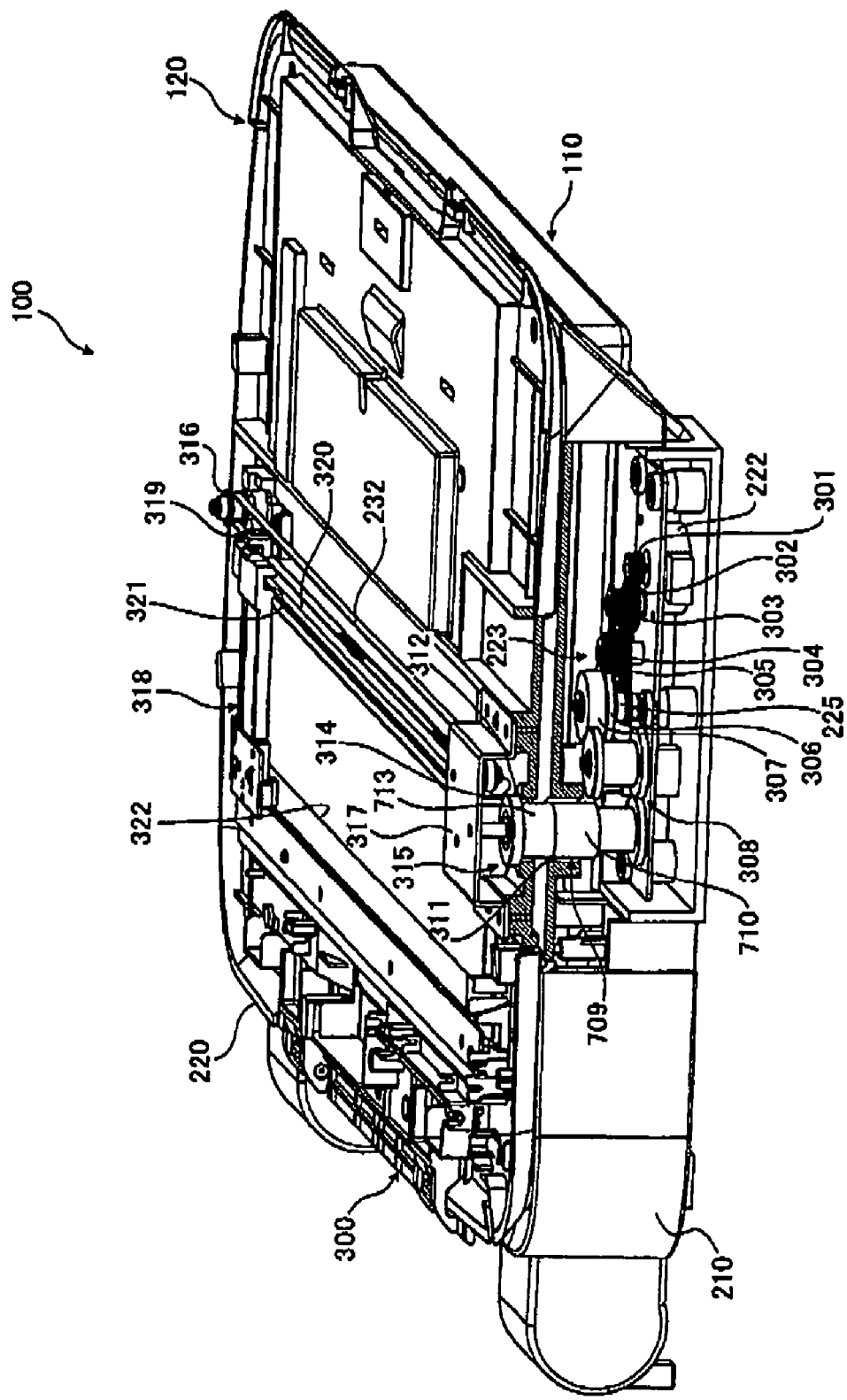
FIG. 7 is a partially sectional perspective view of a scanner according to a second embodiment of the invention.

FIG. 7 is a partially sectional perspective view of a scanner 100 according to the second embodiment of the invention. FIG. 7 shows a state where the upper TPU housing of the TPU housing 230 is removed and a part of the main body housing 210 is cut out. Now, the elements supplied with the driving force of the motor 222 are described with reference to FIG. 7.

As shown in FIG. 7, the pulley 307 is connected to a magnetic member 710 constituting a part of the interlocking mechanism 709 through a plurality of pulley groups. The magnetic member 710 rotates around the axis line parallel to the axial direction of the pulley groups 308 by supplying the driving force of the motor 222 thereto through the pulley groups 308.

The magnetic member 710 is disposed to face the magnetic member 713 disposed on the TPU unit 120 with the openings 311 and 312 which are opened toward the TPU unit 120 therebetween on the top surface of the main body housing 210. The magnetic member 710 and the magnetic member 713 are separably connected to each other by an attraction force of attracting each other. Here, the interlocking mechanism 709 includes the pulley 307, the pulley groups 308, the magnetic member 710, the openings 311 and 312, and the magnetic member 713. The magnetic member 713 is disposed to be rotatable around the axis line parallel to the axial direction of the magnetic member 710.

Both magnetic members 710 and 713 constituting the interlocking mechanism 709 may have a magnetic force of attracting each other or at least one thereof may have a magnetic force of attracting the other. When one of the magnetic members 710 and 713 has a magnetic force, the other is formed of a material such as iron having a feature attracted by a magnetic force.

The interlocking mechanism 709 has a torque limiter function of not supplying the driving force having a magnitude larger than a predetermined magnitude to the pulley group 315 by allowing the magnetic member 710 and the magnetic member 713 to slide on each other when the torque supplied from the image capturing device moving mechanism 223 is larger than a predetermined value. Here, the torque having the predetermined magnitude is a torque necessary to move the transmissive light source unit 318.

Thanks to the torque limiter function of the interlocking mechanism 709, it is possible to prevent the elements associated with the movement of the transmissive light source unit 318 from damaging, such as the transmissive light source unit 318, the pulley group 315, and the pair of gears on which the drive belt 233 is suspended.

Figure 8:
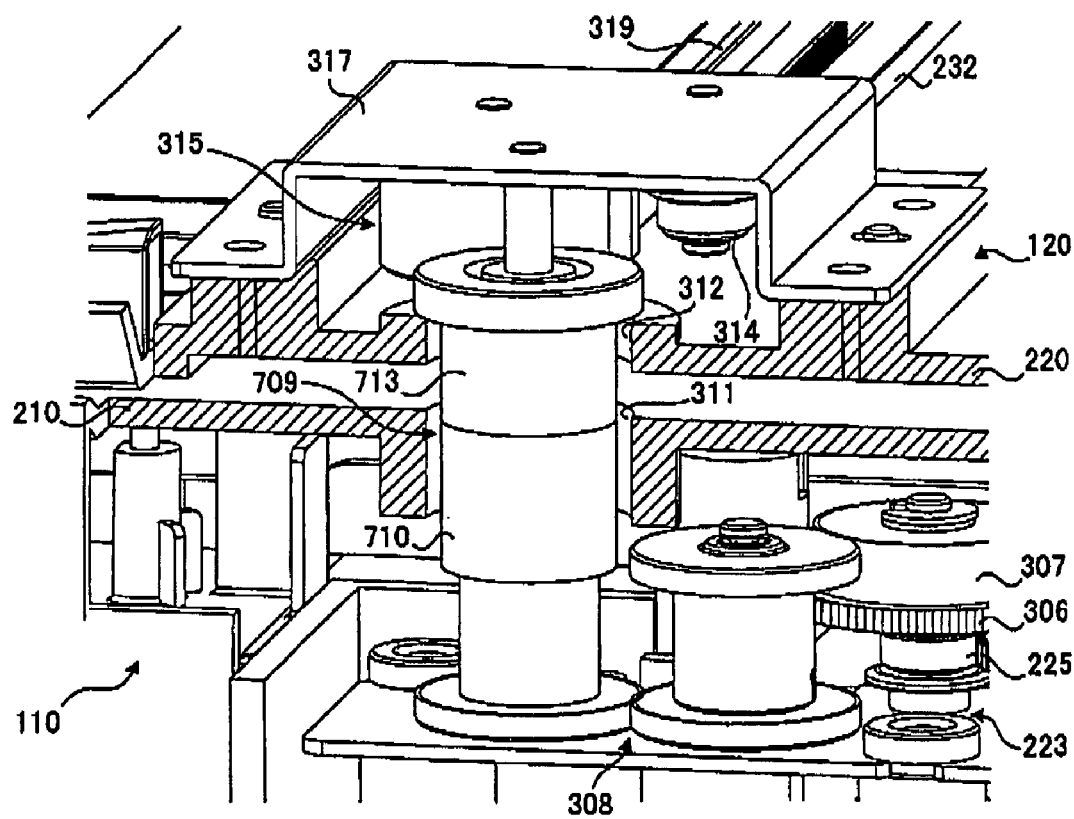
FIG. 8 is an enlarged perspective view of an interlocking mechanism (first).
Figure 9:
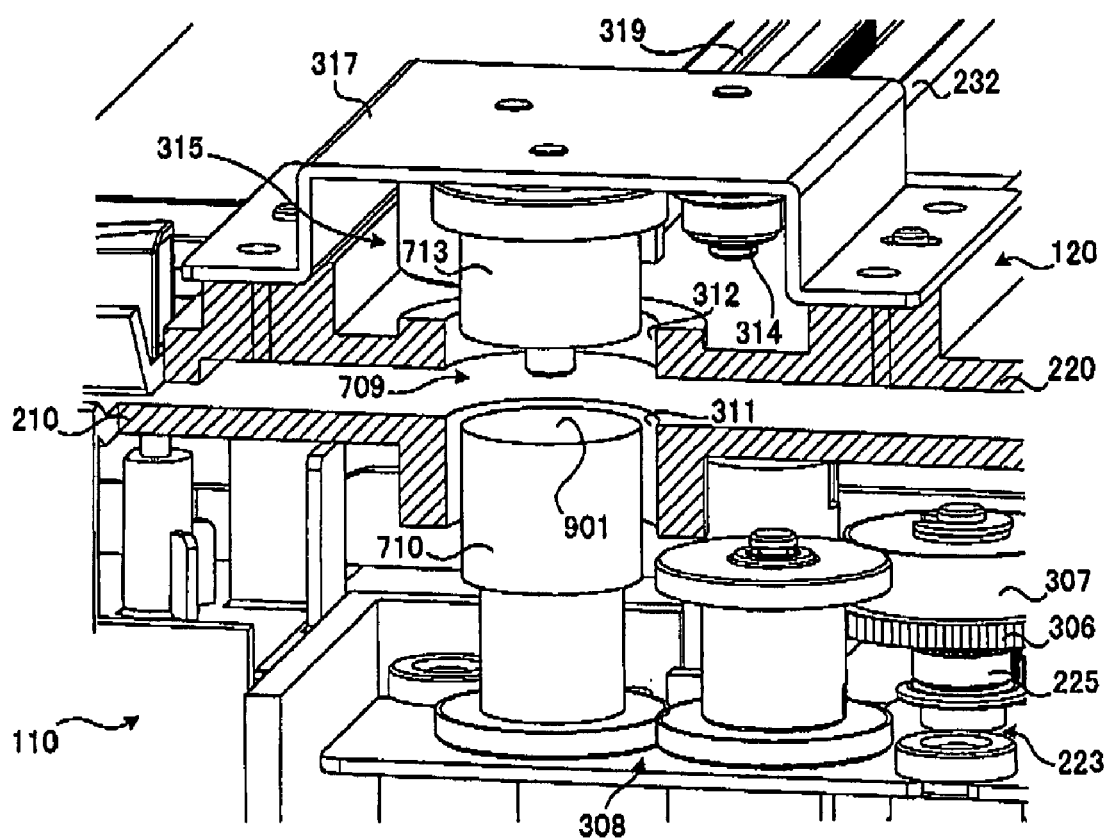
FIG. 9 is an enlarged perspective view of the interlocking mechanism (second).

FIG. 8 is an enlarged perspective view (first) of the interlocking mechanism 709 and FIG. 9 is an enlarged perspective view (second) of the interlocking mechanism 709. FIG. 8 shows a state where the magnetic member 710 and the magnetic member 713 are connected to each other by a magnetic force. FIG. 9 shows a state where the magnetic member 710 and the magnetic member 713 are separated from each other.

As can be seen from FIGS. 8 and 9, the magnetic member 713 of the interlocking mechanism 709 is connected to the magnetic member 710 when it is separated from the stay 317, and is separated from the magnetic member 710 when it is located in the vicinity of the stay 317. The opposed surfaces of the magnetic members 710 and 713 are planar (see reference numeral 901). Accordingly, it is possible to secure a wide plane on which the attraction force acts, thereby reliably connecting the magnetic member 710 to the magnetic member 713.

When an image of a film is read by the scanner 100 having the above-mentioned configuration, the film is placed similarly to the first embodiment, the protective mat 232 is removed from the TPU housing 230, and the TPU unit 120 is allowed to rotate so as to oppose the TPU unit 120 to the main body unit 110. Accordingly, an attraction force acts between the magnetic member 710 and the magnetic member 713 of the interlocking mechanism 709, thereby connecting the light source moving mechanism to the image capturing device moving mechanism 223.

As described above, according to the scanner 100 of the second embodiment, in addition to the same advantages as the first embodiment, it is possible to prevent the transmissive light source unit 318 and the light source moving mechanism from damaging, thanks to the torque limiter function. Accordingly, a user can obtain image data with high precision by the use of the scanner 100 with high reliability.

Although the scanner 100 in which the motor 222 is disposed in the main body unit 110 has been described in the first and second embodiments, the invention is not limited to the embodiments. The motor 222 may be disposed in the TPU unit 120.

As described above, according to the scanner 100 of the second embodiment, similarly to the first embodiment, it is possible to accomplish a decrease in size of the scanner 100 due to the sharing of the motor 222 and a decrease in power consumption accompanied with the sharing of the motor 222 by interlocking the light source moving mechanism with the image capturing device moving mechanism 223, depending on the attachment or detachment of the TPU unit 120 to or from the main body unit 110.

Accordingly, a user can easily interlock the light source moving mechanism with the image capturing device moving mechanism 223 by only performing an operation of attaching and detaching the TPU unit 120 to and from the document table glass 212, thereby obtaining image data with high precision.

Although it has been described in the scanner 100 according to the first and second embodiments that the motor 222 is disposed in the main body housing 210, the invention is not limited to the embodiments. The motor 222 may be disposed in the TPU unit housing 230. In the scanner having the above-mentioned configuration, it is possible to reduce the number of elements disposed in the main body housing 210.

Accordingly, it is possible to prevent a damage of the scanner due to the heat radiation resulting from the excessive density in the main body housing 210. Accordingly, a user can use safely a small-sized scanner with reduced power consumption and can obtain image data with high precision by only rotating the TPU unit 120 about the document table glass 212.

Third Embodiment

Next, an image reading apparatus according to a third embodiment of the invention will be described in detail with reference to the accompanying drawings. The third embodiment relates to a multi-function machine in which the image reading apparatus and the multi-function machine according to the invention are embodied. In the third embodiment, the same elements as the first and second embodiments are denoted by the same reference numerals and description thereof is omitted.

Figure 10:
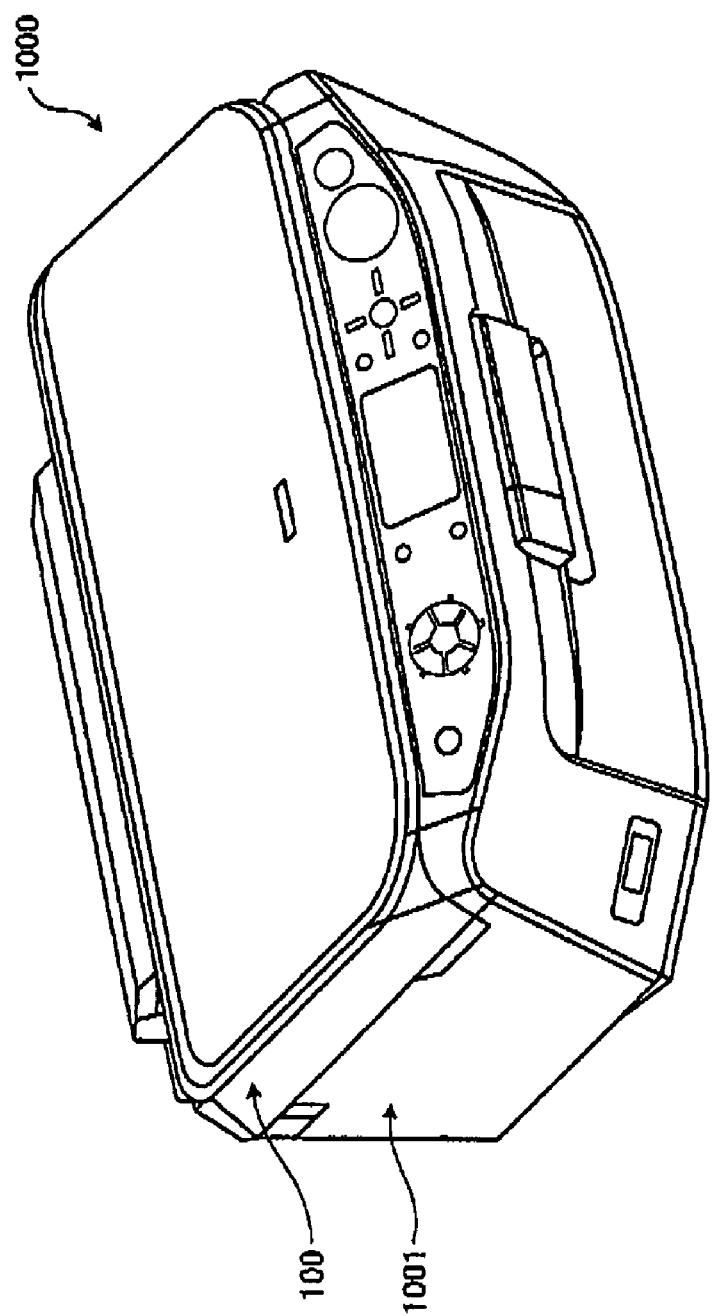
FIG. 10 is a perspective view illustrating an appearance of a multi-function machine according to a third embodiment of the invention.

FIG. 10 is a perspective view illustrating an appearance of a multi-function machine according to the third embodiment of the invention. The multi-function machine 1000 according to the third embodiment includes the scanner 100 described in the first and second embodiments and a printer 1001 as an image forming apparatus for forming on a recording medium an image corresponding to intensity of light incident on the image capturing device 217 of the scanner 100.

The scanner 100 and the printer 1001 are connected to each other so as to communicate with each other through a communication I/F not shown. The scanner 100 outputs image data corresponding to the intensity of light incident on the image capturing device 217 to the printer 1001.

The printer 1001 includes a printer engine for forming an image on a recording medium such as a sheet of paper. A variety of methods such as an ink jet method, an electrostatic transfer method, and a sublimation transfer method can be used as the image forming method of the printer engine.

In the multi-function machine 1000 having the above-mentioned configuration, the printer 1001 forms an image on a recording medium such as a sheet of paper on the basis of the image data output from the scanner 100.

According to the multi-function machine 1000, it is possible to form on a recording medium such as a sheet of paper an image based on the image data, which are reproduced from the image of the document with high precision, regardless of the types of the document. Accordingly, a user can obtain a recording medium having an image formed thereon based on the image data which are reproduced from the image of the document with high precision.

What is claimed is:

1. An image reading apparatus which has a light source and an image capturing device disposed to face each other with a document table interposed therebetween and holding a document, the image reading apparatus comprising:
    an image capturing device moving mechanism, comprising a first drive belt operable to perform a moving operation for moving the image capturing device in a scanning direction and a driving source operable to supply a driving force to the first drive belt;
    a light source moving mechanism, comprising a second drive belt operable to move the light source in the first direction with the movement operation performed by the image capturing device moving mechanism; and
    an interlocking mechanism, operable to interlock the image capturing device moving mechanism with the light source moving mechanism, the interlocking mechanism operable to supply the driving force of the driving source to the second drive belt through a plurality of gears so that the first drive belt and the second drive belt are interlocked with each other, the interlocking mechanism comprising a first gear and a second gear which engage with each other, the first gear provided with gear teeth protruding toward the second gear, the second gear including ribs forming concave portions engaging with the gear teeth, a portion of each of the ribs which protrudes toward the first gear being formed in a mounting shape so that the gear teeth are guided to the concave portions.

2. The image reading apparatus according to claim 1, wherein
    the light source moving mechanism moves the light source by using the driving force of the driving source, which is used by the image capturing device moving mechanism.

3. The image reading apparatus according to claim 1, wherein
    the light source includes an LED.

4. A multi-function machine comprising:
    the image reading apparatus according to claim 1; and
    an image forming apparatus operable to form on a recording medium an image corresponding to intensity of light received by the image capturing device of the image reading apparatus.

5. An image reading apparatus which has a light source disposed in a cover member which is attached to and detached from a document table for holding a document and an image capturing device disposed opposite to the light source with the document table interposed therebetween, the image reading apparatus comprising:
    an image capturing device moving mechanism, operable to move the image capturing device in a scanning direction;
    a driving source, operable to supply a driving force to the image capturing device moving mechanism;
    a light source moving mechanism, disposed in the cover member and operable to move the light source in the scanning direction; and
    a first gear, operable to supply the driving force to the light source moving mechanism;
    a stay, fixed on the cover member, and supporting a shaft of the first gear; and
    a second gear, connected to the image capturing device moving mechanism, and operable to supply the driving force to the first gear,
    wherein the first gear is disposed to be detachable from the stay,
    wherein the second gear is formed with concave portions engaging with gear teeth of the first gear,
    wherein each of ribs which are located between the concave portions is formed in a mountain shape, a center of which protrudes toward the first gear, and
    wherein the first gear engages with the second gear only when the cover member is in a closed state.

6. The image reading apparatus according to claim 5, further comprising:
    a hinge portion, rotatably connecting one end of the cover member to a main body housing for housing the image capturing device, wherein
    the cover member rotates about the main body housing with the hinge portion so as to be attached to and detached from the document table.

7. The image reading apparatus according to claim 6, wherein
    the driving source is disposed in the main body housing.

8. The image reading apparatus according to claim 5, wherein
    the driving source is disposed in the cover member.

9. The image reading apparatus according to claim 5, wherein
    the light source includes an LED.

10. A multi-function machine comprising:
    the image reading apparatus according to claim 5; and
    an image forming apparatus operable to form on a recording medium an image corresponding to intensity of light received by the image capturing device of the image reading apparatus.

11. An image reading apparatus which has a light source disposed in a cover member which is attached to and detached from a document table for holding a document and an image capturing device disposed opposite to the light source with the document table interposed therebetween, the image reading apparatus comprising:
    a light source moving mechanism, disposed in the cover member and operable to move the light source in a scanning direction;
    an image capturing device moving mechanism, operable to move the image capturing device in the scanning direction;
    a driving source, operable to supply a driving force to the image capturing device moving mechanism; and
    an interlocking mechanism, including a pair of gears engaging with each other depending on a position of the cover member relative to the document table, and operable to interlock the image capturing device moving mechanism with the light source moving mechanism through the pair of gears.

12. The image reading apparatus according to claim 11, wherein the pair of gears engage with each other when the cover member is in a state where light emitted from the light source can be received by the image capturing device.

13. The image reading apparatus according to claim 11, wherein the pair of gears engage with each other by fitting uneven portions formed between a pair of rotating members capable to rotate about an axial shaft substantially parallel to an opposing direction in which the light source and the image capturing device are disposed opposite to each other.

14. The image reading apparatus according to claim 13, wherein the rotating members are disposed opposite to each other in the opposing direction.

15. The image reading apparatus according to claim 11, further comprising:

a hinge portion, rotatably connecting one end of the cover member to a main body housing for housing the image capturing device, wherein the cover member rotates about the main body housing with the hinge portion so as to be attached to and detached from the document table.

16. The image reading apparatus according to claim 11, wherein the light source includes an LED.

17. A multi-function machine comprising:

the image reading apparatus according to claim 11; and an image forming apparatus operable to form on a recording medium an image corresponding to intensity of light received by the image capturing device of the image reading apparatus.

* * * * *